United States Patent
Korhonen

(10) Patent No.: US 9,241,264 B2
(45) Date of Patent: Jan. 19, 2016

(54) NETWORK ACCESS AUTHENTICATION FOR USER EQUIPMENT COMMUNICATING IN MULTIPLE NETWORKS

(75) Inventor: Jouni Korhonen, Riihimäki (FI)

(73) Assignee: TeliaSonera AB, Stockholm (SE)

( * ) Notice: Subject to any disclaimer, the term of this patent is extended or adjusted under 35 U.S.C. 154(b) by 643 days.

(21) Appl. No.: 12/734,781

(22) PCT Filed: Nov. 25, 2008

(86) PCT No.: PCT/FI2008/050681
§ 371 (c)(1),
(2), (4) Date: May 24, 2010

(87) PCT Pub. No.: WO2009/068740
PCT Pub. Date: Jun. 4, 2009

(65) Prior Publication Data
US 2010/0242100 A1 Sep. 23, 2010

(30) Foreign Application Priority Data
Nov. 27, 2007 (FI) .................................... 20075844

(51) Int. Cl.
*H04W 12/08* (2009.01)
*H04L 29/06* (2006.01)
(Continued)

(52) U.S. Cl.
CPC ............ *H04W 12/06* (2013.01); *H04L 63/0884* (2013.01); *H04L 63/0815* (2013.01); *H04L 63/0853* (2013.01); *H04W 88/02* (2013.01)

(58) Field of Classification Search
CPC ............ H04L 63/0815; H04L 63/0853; H04L 63/0884; H04W 12/06; H04W 88/02
USPC ............... 709/249; 726/4, 7, 5; 455/411, 428; 380/283
See application file for complete search history.

(56) References Cited

U.S. PATENT DOCUMENTS 7,545,768 B2 * 6/2009 Haverinen et al. ............ 370/328
7,715,822 B2 * 5/2010 Semple et al. ................ 455/411
(Continued)

FOREIGN PATENT DOCUMENTS

| EP | 1 379 053 A1 | 1/2004 |
|---|---|---|
| WO | WO 03/094438 A1 | 11/2003 |
| WO | WO 2004/097590 A2 | 11/2004 |

OTHER PUBLICATIONS

Huang, C.-M.; Li, J.-W., "Authentication mechanism over the integrated UMTS network and WLAN platform using the cross-layer bootstrap", Communications, IET vol. 1 , Issue: 5 . 2007 , pp. 866-874 [retrieved on Jun. 17, 2012 from IEEE database].*
(Continued)

*Primary Examiner* — Saleh Najjar
*Assistant Examiner* — Oleg Korsak
(74) *Attorney, Agent, or Firm* — Cozen O'Connor

(57) ABSTRACT

The invention relates to a method, an element, and a system for providing access authentication for a user using user equipment (1-2) communicating (1) in a first communications network (1-30) accepting a first type of identification to a second communications network (1-16, 1-20) accepting a second type of identification. In the invention, an identifier comprising a first part and a second part is received (5); a corresponding second part is retrieved (7) from a database (BSF) by using the first part; the received second part is compared with the retrieved corresponding second part; and if they are the same, the user equipment (1-2) is provided with access authentication to the second communications network (1-16, 1-20).

21 Claims, 1 Drawing Sheet

(51) Int. Cl.
*H04L 9/32* (2006.01)
*H04W 12/06* (2009.01)
*H04W 88/02* (2009.01)

(56) References Cited

U.S. PATENT DOCUMENTS

| | | | | |
|---|---|---|---|---|
| 7,835,528 | B2* | 11/2010 | Bajko et al. | 380/283 |
| 7,984,298 | B2* | 7/2011 | Wei et al. | 713/171 |
| 8,046,824 | B2* | 10/2011 | Holtmanns et al. | 726/4 |
| 8,087,069 | B2* | 12/2011 | Bajko et al. | 726/4 |
| 2006/0205387 | A1* | 9/2006 | Laitinen | 455/411 |
| 2006/0212700 | A1* | 9/2006 | Zhang | 713/167 |
| 2007/0178885 | A1 | 8/2007 | Lev | |
| 2008/0160959 | A1* | 7/2008 | Huang et al. | 455/411 |
| 2009/0282238 | A1* | 11/2009 | Bichot et al. | 713/155 |

OTHER PUBLICATIONS

Koien, G.M.; Haslestad, T., "Security aspects of 3G-WLAN interworking", Communications Magazine, IEEE vol. 41, Issue: 11 Year: 2003, pp. 82-88 [retrieved on Jun. 17, 2012 from IEEE database].*

Sher, M.; Magedanz, T., "Secure access to IP multimedia services using generic bootstrapping architecture (GBA) for 3G & beyond mobile networks", Proceeding Q2SWinet '06 Proceedings of the 2nd ACM international workshop on Quality of service & security for wireless and mobile networks pp. 17-24 [retrieved on Jun. 17, 2010 from ACM].*

Salkintzis, A.K., "Interworking techniques and architectures for WLAN/3G integration toward 4G mobile data networks", vol. 11, Issue: 3, 2004, pp. 50-61 [retrieved on Jun. 17, 2010 from IEEE database].*

"3rd Generation Partnership Project; Technical Specification Group Services and System Aspects; Generic Authentication Architecture (GAA); Generic bootstrapping architecture (Release 8)" 3GPP TS 33.220 V8.1.0 (Sep. 2007).*

"Universal Mobile Telecommunications System (UMTS); Bootstrapping interface (Ub) and network application function interface (Ua); Protocol details (3GPP TS 24.109 version 6.4.0 Release 6)", ETSI TS 124 109 V6.4.0 (Sep. 2005).*

Timo Olkkonen. "Generic Authentication Architecture, TKK T-110. 5290 Seminar on Network Security". Dec. 11-12, 2006.*

Shi et al. (IEEE802.11 Roaming and Authentication in Wireless LAN/Cellular Mobile Networks IEEE Wireless Communications • Aug. 2004, pp. 66-75).*

Universal Mobile Telecommunications System (UMTS); Generic Authentication Architecture (GAA); Generic bootstrapping architecture (3GPP TS 33.220 version 6.9.0 Release 6); ETSI TS 133 220, Jan. 6, 2006 XP014034449, pp. 1-41, especially section 4.5.

Huang C-M et al: Authentication Mechanism over the Integrated UMTS Network and WLAN platform Using the Cross-Layer Bootstrap, 20071004, vol. 1, No. 5, Oct. 4, 2007 pp. 866-874.

3GPP: Generic Authentication Architecture (GAA): Generic Authentication Architecture (release 8), Sep. 2007 pp. 1-75.

Oikkonen, Timo: Generic Authentication Procedure, Dec. 12, 2006 pp. 1-5.

Sebastian Wahle: Design and Implementation of HTTP-Based Authentication Infrastructure for Service Access to the IP Multimedia Subsystem, Technische Universität Berlin Jan. 15, 2007, pp. 1-186.

* cited by examiner

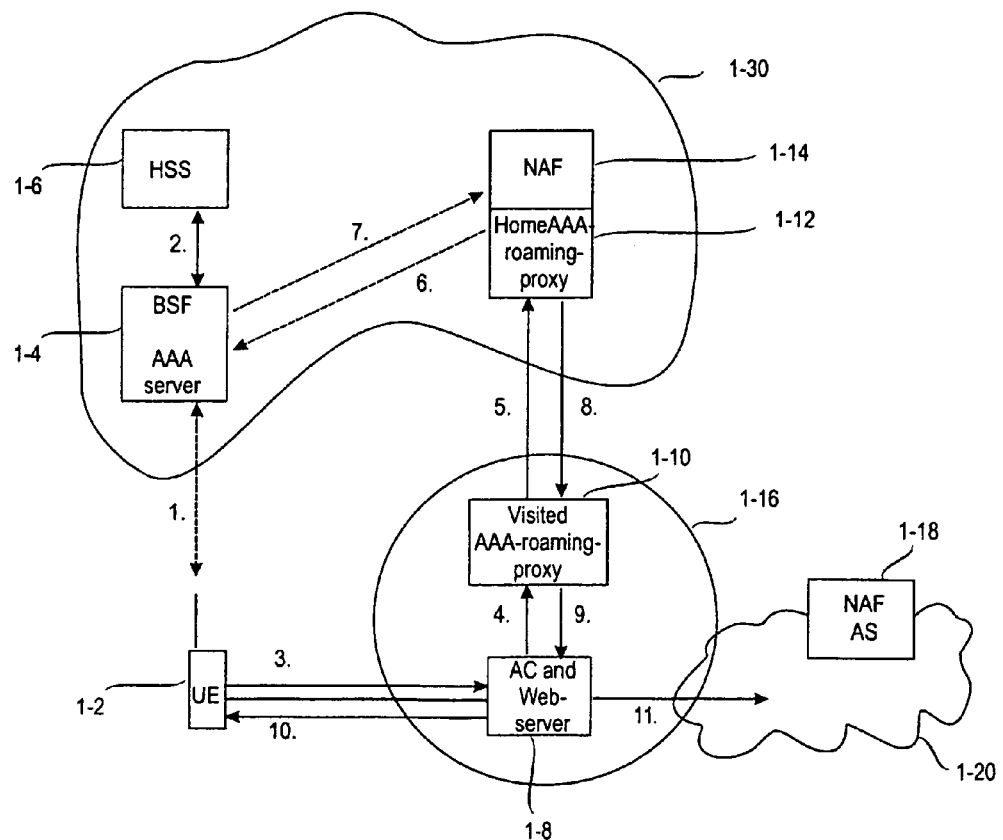

NETWORK ACCESS AUTHENTICATION FOR USER EQUIPMENT COMMUNICATING IN MULTIPLE NETWORKS

PRIORITY CLAIM

This is the U.S. national stage of application No. PCT/FI2008/050681, filed on 25 Nov. 2008. Priority is claimed from Finland Patent Application No. 20075844, filed 27 Nov. 2007, the entire content of which is expressly incorporated herein by reference.

FIELD OF THE INVENTION

The present invention relates to communications technology, and more particularly to network access authentication.

BACKGROUND OF THE INVENTION

Different third generation 3G multimedia services have potential usage of a generic bootstrapping architecture GBA provided by the third generation partnership project 3GPP and being based on the authentication and key agreement AKA protocol to distribute subscriber certificates. These certificates are used by mobile operators to authenticate a subscriber before accessing the multimedia services and applications over a hypertext transfer protocol HTTP. The services and applications include presence (like an instant message system), video conferencing, messaging, video broadcasting, a push to talk application etc., and they are offered by IMS (IP, internet protocol, multi-media subsystem) operators. An infrastructure of the generic bootstrapping architecture also enables an application function in the network and on the user side to use shared keys. The GBA architecture has been enhanced by implementing a generic authentication architecture GAA to provide secure access over HTTP using a transport layer security TLS. GAA describes a generic architecture for peer authentication that can a priori serve for any present and future application. GM may also be described to be an authentication frame-work with an authentication reference model linking together GBA, security mechanisms, shared secret based and certificate based, and functional features.

Currently, however, it is not possible to have access authentication for a user using user equipment communicating in a first communications network accepting a first type of identification to a second communications network accepting a second type of identification with the first type of identification. This causes problems e.g. in the network management.

BRIEF DESCRIPTION OF THE INVENTION

It is thus an object of the present invention to provide a method and an apparatus for implementing the method so as to solve the above problem. The objects of the invention are achieved by a method and an arrangement which are characterized by what is stated in the independent claims. Preferred embodiments of the invention are disclosed in the dependent claims.

The invention is based on the idea of providing authentication to a system which does not use an identifier with which the user equipment was initially identified. E.g. a SIM (subscriber authentication module) authentication can be made to an environment which does not use a SIM identifier.

An advantage of the method and arrangement of the invention is that the network management of different systems becomes easier and more efficient e.g. in that it saves system resources and in that no modifications need to be made to the current system(s).

BRIEF DESCRIPTION OF THE DRAWINGS

In the following, the invention will be described in greater detail by means of preferred embodiments and with reference to the attached drawing, in which FIG. 1 shows an authentication and service architecture according to the invention and its embodiments.

DETAILED DESCRIPTION OF THE INVENTION

In the following, the invention and its embodiments will mainly be described in connection with two communications systems and with two access networks. They will also be described in connection with two different ways to access a core network. However, the invention and its embodiments are not restricted to the number of communications systems or access networks or ways to make the access. Also, regarding the invention, the operation and structure of communications systems and access networks are described only to a degree that will assist in comprehending the invention and its embodiments. The invention and its embodiments are not specific to the particular communications system and access networks, but it will be appreciated that the present invention and its embodiments have application in many system types and may, for example, be applied to a circuit switched domain e.g. in a GSM (Global System for Mobile Communications) digital cellular communication system, in a packet switched domain, e.g. in the UMTS (Universal Mobile Telecommunications System) system, and e.g. in networks according to the IEEE 802.11 standards: WLAN (Wireless Local Area networks), HomeRF (Radio Frequency) or BRAN (Broadband Radio Access Networks) specifications (HIPERLAN1 and 2, HIPERACCESS). The invention and its embodiments can also be applied to a legacy network system describing a network that is not based on the IP (Internet Protocol) or TCP/IP (Transmission Control Protocol/Internet Protocol) protocol. Examples of legacy networks include any IP access network that is not able to provide (U)SIM (UMTS Subscriber Identity Module) based network access authentication as a part of a natural access authentication procedure. These include IPX (Internet Packet Exchange), SNA, Appletalk and DECnet networks. One embodiment is a WLAN access network without any kind of EAP (Extensible Authentication Protocol) support such as Web login based hotspot. The invention and its embodiments may also be applied to ad hoc communications systems that provide IP access, such as an IrDA (Infrared Data Association) network or a Bluetooth network. In other words, the basic principles of the invention may be employed to enable authentication between and/or within any mobile communications systems of the $2^{nd}$, $2.5^{th}$, $3^{rd}$, and $4^{th}$ generation, such as GSM, GPRS (General Packet Radio Service), TETRA (Terrestrial Trunked Radio), UMTS systems and HSPA (High Speed Packet Access) systems e.g. in WCDMA (Wideband Code Division Multiple Access) technology. The present invention is applicable to any user terminal, server, corresponding component, and/or to any communications system or any combination of different communications systems.

The protocols used, the specifications of communications systems, servers and user terminals, especially in wireless communication, develop rapidly. Such development may require extra changes to an embodiment. Therefore, all words and expressions should be interpreted broadly and they are intended to illustrate, not to restrict, the embodiment.

FIG. 1 shows an authentication and service architecture according to the invention and its embodiments. The element, an apparatus 1-2, may be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from the network and/or capable of transmitting information to the network, and being connectable to the network in different ways, e.g. wirelessly or via a fixed connection. Examples of the user terminal include a personal computer, a game console, a laptop (a notebook), a personal digital assistant, a mobile station (a mobile phone), a communicator, and a line telephone.

The element 1-2, which can be GAA capable, can comprise means for processing or means for applying e.g. at least one of the following services, applications or messages: presence, video conferencing, messaging, video broadcasting, a push to talk, a short message, an instant message, an e-mail message, a multimedia message, a unified messaging message, a WAP (Wireless Application Protocol) message or an SIP (Session Initiation Protocol) message. The mobile station, the device may also be a mobile station or a device equipped with e.g. a presence, a video conferencing, a messaging, a video broadcasting, a push to talk, an instant message, an e-mail message, a multimedia message, a unified messaging message, a WAP message or an SIP message service or application and services and applications like voice calls, wireless Internet browsing, and web broadcasting.

Apparatuses, such as servers, or corresponding server components, user terminals and/or other corresponding devices or apparatuses implementing the functionality of a corresponding apparatus described with an embodiment comprise not only prior art means, but also means for authenticating the equipment. More precisely, they comprise means for implementing a functionality of a corresponding apparatus described with an embodiment and they may comprise separate means for each separate function, or means may be configured to perform two or more functions. Present apparatuses comprise processors and memory that can be utilized in an embodiment. For example, an AAA (authentication, authorisation, and accounting) server unit 1-4 and/or proxy units 1-10 and 1-12 may be a software application, or a module, or a unit configured as arithmetic operation, or as a program, executed by an operation processor. All modifications and configurations required for implementing a functionality of an embodiment may be performed as routines, which may be implemented as added or updated software routines, application circuits (ASIC, Application Specific Integrated Circuit) and/or programmable circuits. Software routines, also called program products, including applets and macros, can be stored in any apparatus-readable data storage medium and they include program instructions for performing particular tasks. Software routines may be downloaded into an apparatus. The apparatus, such as a server, or a corresponding server component, or a user terminal may be configured as a computer including at least a memory for providing a storage area used for arithmetic operation and an operation processor for executing the arithmetic operation. An example of the operation processor includes a central processing unit. The memory may be removable memory detachably connected to the apparatus.

The steps/points, signaling messages and related functions described in FIG. 1 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The server operations illustrate a procedure that may be implemented in one or more physical or logical entities. The signaling messages are only exemplary and may even comprise several separate messages for transmitting the same information. In addition, the messages may also contain other information.

According to FIG. 1, the user equipment can communicate 1 with the AAA (authentication, authorisation, and accounting) server 1-4 having a bootstrapping server function BSF. The server 1-4 can be in communication 2 with a database HSS 1-6 (home subscriber server), which is provided for the user equipment for keeping information associated with the user equipment. An element 1-8 describes an access control element AC and a web server, e.g. an Internet server. The AC element can be described as a gateway 3, 10 between an IP network, such as the Internet, and the wireless user equipment 1-2, which can be attached e.g. to a wireless local area network.

The server 1-8 is in communication with a visited AAA roaming proxy 1-10. The proxy transports communications messages from a visited operator, such as a visited WLAN operator, to a home operator, such as a home WLAN operator, and vice versa. The visited AAA roaming proxy 1-10 is in communication with a home AAA roaming proxy 1-12. The home proxy provides a controlled traffic point to and from a home network 1-30.

The home AAA roaming proxy 1-12 can also function as a network application function element NAF of a general bootstrapping architecture GBA. The NAF element 1-14 can recide and communicate 6, 7 securely with the BSF function of the subscriber.

The proxies and the BSF function can be adapted to a NAF ability. This means that they can communicate with a NAF functionality and protocol. Different elements of FIG. 1 can also have an ability for different communications systems, as was described above.

An area 1-16 covering the server 1-8 and the proxy 1-10 describes a visited network. It must be noted that, according to the invention and its embodiments, it does not have to be altered or modified. It can be accessed in accordance with a web based access logic of the visited network.

The element 1-18 describes a network application function in connection with a communications network 1-20. The user can access different services, services providers, gateways, access networks or another networks through and/or via the network 1-20. The reference number can also describe services the user wishes to access.

The elements HSS, BSF and NAF can be part of the GAA and/or GBA architecture. They can be defined to belong to the home network. The home network can also include other elements not shown in FIG. 1. Some elements of the home network of FIG. 1 can also be located outside the home network. E.g. the NAF function can be any service element which provides the NAF function. It can be located in the home network, in the visited network or even outside the network of the operator. The home network can be said to be the core network of an operator.

One possibility for the authentication and service architecture to function is shown in FIG. 1. In step 1, the user equipment can perform GBA bootstrapping signalling using a bootstrapping server function. This function can be e.g. an authentication and key agreement AKA function or subscriber identity module SIM authentication, such as HTTP-Digest-AKA (HTTP, hyper-text transfer protocol) or UMTS-AKA. This function can be carried out periodically and/or in response to a triggering event and/or on request. The period can be e.g. one or more minutes, hours, days or months. The request can be made on the GPRS side of the network via a Ub interface. In step 2, the BSF element can check the profile of a user of a UE in communication with the database element 1-6. It can also carry out the authentication with the HSS data-base via a Zh interface.

The BSF function now knows that the user equipment exists, and BSF can give a temporary or a fixed identification and/or a random number to the user identification. If this key material is for temporary use, it can have a certain lifetime after which the key cannot be used any more. The identifier signalled to the user equipment can comprise one or more parts, e.g. a first part and a second part.

As will be described below, the first part of the identifier can be a shared secret serving as a password known to both the user equipment 1-2 and the database 1-6. The second part of the identifier can be used for designating and indexing the first part of the identifier. Furthermore, the value of the first part and/or the second part of the identifier can be locally or globally unique.

After steps 1 and 2, the user equipment and the communications network are authenticated. The user equipment knows an identifier B-TID and some information which was used when B-TID was derived in BSF. This results in a shared secret KS, a text string that can serve as a password which is known to both the user equipment and the network BSF. In addition, both the user equipment and the network know the identifier, such as B-TID, which can later be used for designating and indexing the shared secret.

The identifier or part of it can be derived by different cryptographic methods and the identifier or part of it can further be modified, e.g. such that it is not readable. The value of the identifier can be locally and/or globally unique and its form can be e.g. "BASE64_Encoded (RAND)@FQDN", where RAND can be a random number generated by the element HSS. FQDN is a DNS (domain name server) name of the function BSF which carried out the authentication. The identifier B-TID can be an identifier NAI. It can be said that the GPA architecture generates the authentication and/or recognition between the home network 1-30 and the user equipment 1-2.

In step 3, which is next, in connection with the authentication to the visited network, the user equipment forwards a username and a password it received from the home AAA server to the AC element and web server. The authentication can be e.g. Internet based authentication or legacy network access authentication. The username can be the identifier B-TID and the password can be derived from the secret KS. This password can then be called a KS-Legacy-PWD.

After this, in step 4, an authentication system of a visited network 1-16 can route the authentication according to an AAA routing to its AAA roaming proxy. In this process, a REALM part, i.e. @FQDN, of the identifier B-TID can be used for addressing the message.

In step 5, the roaming proxy of the visited network can route the AAA message to the AAA proxy of the home network. The REALM of the identifier B-TID can be used in this routing. In this step, an existing AAA roaming can be used, which can be the same as that existing for a WLAN (Wireless Local Area Network) roaming. The identifier B-TID can be in an attribute Username in the AAA protocol and in PWD in the KS-Legacy-PWD.

The AAA roaming proxy of the home network can be the same as the NAF function of the element GBA, and the proxy can compare and/or check and/or understand that the message is in accordance with AAA roaming.

The home proxy 1-12 now knows that a bootstrap function exists and the proxy transmits a message to the BSF element based on the GBA functionality, indicating whether the user equipment exist.

In step 6, the AAA roaming proxy and the NAF element make an into the BSF function of the AAA server. This inquiry can be in accordance with the GBA element, and it can be made over the Zn interface. The value of the identifier B-TID can be used for indexing KS in the function BSF. The function BSF can check the profile of the user for whether roaming from one operator or proxy to another operator or proxy, e.g. legacy roaming, is allowed. It can also check for other functions. The function BSF can then realise that the authentication in question is legacy authentication over the AAA roaming. This can be realised e.g. such that the element NAF conveys the information in one or more attributes added to the interface Zn.

The BSF can generate a new key to the NAF function. The NAF function does not have to know where the key or identifier came from and how the key or the identifier was made.

In other words, the home proxy and the NAF function receive the identifier comprising a first part and a second part, retrieve, using the first part, a corresponding second part from the database HSS, compare the received second part with the retrieved corresponding second part, and if they are the same, provide the user equipment 1-2 with access authentication to the second communications network 1-16, 1-20.

In step 7, the BSF element returns the profile information on the user. It can also return the shared secret. The NAF and AAA roaming proxies can check whether the password obtained from the AAA roaming between the operators or the proxies and the password returned by the BSF element match. If they match, an acceptance is forwarded, e.g. to a service, to a service provider or to a following network 1-20. On the other hand, if they do not match, access is denied.

In step 8, an AAA response is transmitted over a roaming connection back to the visited network over the AAA roaming connection. In step 9, the AAA response and other possible information are transmitted to an access controller. In step 10, a response and other possible information can be transmitted to the user equipment and in step 11, a connection can open to the communications network if the authentication of the user equipment was accepted.

The standard GAA, TS33.220 Generic Authentication Architecture of 3GPP enables the shared secret to be established between the user equipment, the user terminal and the bootstrapping function server BSF of the network. This can be carried out e.g. by using the algorithm AKA or SIM TS33.920. After the establishment, the user equipment and different services can use this shared secret for their own service authentication needs. The shared secret can be referred to as the B-TID information known to the network and/or the terminal. This information can be e.g. a string, such as the NAI identification, which can be e.g. globally unique.

If a multi-radio terminal equipped with a (U)SIM card or information is also used for other services of the mobile network, the problem is network authentication, which is now solved. As examples are given web-based authentication methods to WLAN networks or to xDSL (digital subscriber line) networks, such as TiSPAN-based (Telecoms & Internet converged Services & Protocols for Advanced Networks) networks. This type of legacy systems can have roaming connections between different service providers. The routing can occur with some AAA protocol, such as a RADIUS protocol, based on REALM.

The solution according to the invention and its embodiments can be used for authentication to legacy networks and also for enabling (U)SIM-based user authentication e.g. at the same time. The authentication to the legacy network can utilize e.g. (U)SIM credentials. As will be described below, no modifications to the legacy networks are needed. The invention and its embodiments enable legacy authentication and (U)SIM-based authentication to be joined according to the standard-like solutions. AAA roaming connections are used without any modifications e.g. to the visited network.

KS-Legacy-PWD can be derived according to the standard 3GPP TS33.220, but also by using the generic identifier NAF-ID. Alternatively, a derivation function for the legacy authentication can be defined. This function can be e.g. KS-Legacy-NAF=KDF (KS, "gba-me-legacy", RAND, IMPI, generic_NAF_Id).

It is also possible that the visited network is the home network, i.e. no roaming connection is compulsory.

The invention and its embodiments can connect or map together at least two different systems, e.g. the web-based RADIUS roaming and (U)SIM based WLAN roaming such that GPA and (U)SIM roamings can function together.

The invention and its embodiments can connect or map together an operator-based communication network and a not-operator-based communication network. After this, the not-operator-based network can be seen from the operator-based core network, as if it also were an operator-based network, such as the GPRS network. After this, in web-based authentication, the (U)SIM-based authentication can be used and utilized. This can be carried out with the help of the GPA system, when the user equipment and the BSF element have created and changed the identification material. Also the WLAN roaming can after this be mapped in the home network proxy.

One advantage of the invention and its embodiments is that the solution enables (U)SIM based authentication to the network using the GAA architecture such that no modifications need to be made to the access network or to the visited access network. No EAP (Extensible Authentication Protocol) support from the access network is needed, either.

The invention and its embodiments allow operators to bill on the basis of the usage of a SIM card. The billing routines and management in unlicensed networks become easier, more efficient and they save system capacity. In web-based networks, the network management and the roaming between different networks become easier, more efficient and they save system capacity.

There are also many other advantages of the invention and its embodiments. The solution enables (U)SIM based authentication to legacy networks such as WLAN, TiSPAN web login without EAP SIM/AKA support and/or without any modifications to the access network. It also enables (U)SIM based authentication and roaming based on AAA and REALM with no modifications to existing roaming connection(s). Furthermore, it enables, after the network authentication, a Federated identity type service authentication between services and the user equipment. This authentication can be automatic or in response to a triggering event. The authentication can occur as shown by the GAA element. If the device is GAA capable, the use of GAA for authenticating one or more services is possible and even desirable. In such a case, it is supposed that also the services support GAA.

It should be, however, noted that the authentication needs support according to the GAA/GBA architecture from the home network.

The invention and its embodiments also have the advantage that no user participation in the authentication process is needed, e.g. in HTTP-based web logins, which are usually incompatible. Because the usage of EAP-SIM/AKA architecture outside the standard 802.x is normally implemented in connection with web logins, problems with incompatibilities caused by the web login technologies can now be overcome. Also, if the user equipment negotiates with the AAA of the home network by using some other protocol than HTTP or HTTPS (hypertext transfer protocol secure), the communication will be successful. One example of such negotiation is the usage of a RADIUS protocol directly from the user equipment. Moreover, different proprietary solutions support a possible change of the AAA infrastructure e.g. in the direction of EAP-SIM/AKA. In any case, this will happen via UMA (unlicensed mobile access) and via 3GPP VCC (Voice Call Continuity). In addition, no modifications to access networks or non-standard solutions are needed.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:

authenticating a user of a user equipment to a first communications network by a first network access user identifier of a first network domain type of identifications and a first network access authentication mechanism that controls network access to the first communications network;

generating, after the authenticating and in response to success in the network access authentication of the user of the user equipment to the first communications network, a second network access user identifier of a second network domain type of identifications for use in network access authentication to a second communications network in accordance with a second network access authentication mechanism that is different from the first network access authentication mechanism and controls network access to the second communications network, wherein the second network access user identifier is different from the first network access user identifier and cannot be used in authentication to the first communications network, and the first network access user identifier cannot be used in authentication to the second communications network, and the second communications network is different from the first communications network;

receiving the generated second network access user identifier of the second network domain type of identifications used in the second communications network for network access authentication, the received second network access user identifier comprising a first part and a second part;

retrieving, using only the first part of the second network access user identifier, a corresponding second part of the second network access user identifier from a database; and comparing the received second part with the retrieved corresponding second part and, if they are the same, providing the user of the user equipment with network access authentication to the second communications network, wherein after a successful network access authentication a service authentication using a service access identifier, which is different from the first network access user identifier and different from the second network access user identifier and cannot be used in authentication to the first communications network and in authentication to the second communications network, is enabled.

2. The method according to claim 1, wherein by before receiving the second network access user identifier of the second network domain type, authenticating the user equipment and the second communications network.

3. The method according to claim 1, further comprising providing a shared secret as the first part of the second network access user identifier, wherein the shared secret serves as a password known both to the user equipment and to a database.

4. The method according to claim 3, comprising authenticating the user of the user equipment to the second communications network using a username and a password as the second network access user identifier, wherein a B-TID identifier is the username and the password is derivable from the shared secret.

5. The method according to claim 1, further comprising designating and indexing the first part of the second network access user identifier using the second part of the second network access user identifier.

6. The method according to claim 1, wherein at least one of the value of the first part and the second part of the second network access user identifier is locally or globally unique.

7. The method according to claim 1, wherein the value of the second network access user identifier comprises an encoded random number and a domain server name of the function, which carries out the network access authentication.

8. The method according to claim 1, wherein the second part of the second network access user identifier is a B-TID identifier, which is an NAI identifier.

9. The method according to claim 1, wherein the second network access authentication mechanism used in the second communications network comprises one of an Internet based authentication and a legacy authentication.

10. The method according to claim 1, wherein the second network access user identifier comprising the first part and the second part is received in an AAA (authentication, authorisation, and accounting) message, and wherein the AAA message is the same message used for authenticating the user equipment to the first communications network.

11. The method according to claim 1, wherein the first authentication mechanism is (U)SIM based authentication, the second authentication mechanism is using GBA, and the service authentication is using GAA.

12. A system comprising:
a first communications network configured to use a first network domain type of identifications and a first network access authentication mechanism to control network access to the first communications network;
a second communications network that is different from the first communications network and configured to use a second network domain type of identifications and a second network access authentication mechanism to control network access to the second communications network, the second network access authentication mechanism being different from the first net-work access authentication mechanism, the second network domain type of identifications being different from the first network domain type of identifications and not usable for authentication to the first communications network, wherein the first network domain type of identifications cannot be used for authentication to the second communications network;
an element configured to authenticate a user of a user equipment to the first communications network by a first network access user identifier of the first network domain type of identifications and the first network access authentication mechanism, to generate after a successful network access authentication of the user of the user equipment to the first communications network, a second network access user identifier of the second network domain type of identifications that is different from the first network access user identifier and comprises a first part and a second part, and to send the generated second network access identifier to the user equipment over the first communications network;
a proxy element configured to receive from the user equipment the second network access user identifier of the second network domain type of identifications used in the second communications network for network access authentication, the received second identifier comprising the first part and the second part; and
a server element configured to retrieve, using only the first part of the second network access identifier, a corresponding second part from a database and for transmitting the retrieved corresponding second part to the proxy element,
wherein the proxy element is further configured to compare the received second part received from the user equipment with the corresponding second part retrieved by the server element and, if they are the same, to provide the user equipment with network access authentication to the second communications network,
wherein the system is configured, after a successful network access authentication, to enable a service authentication using a service access identifier, which is different from the first network access user identifier and different from the second network access user identifier and cannot be used for authentication to the first communications network and for authentication to the second communications network.

13. The system according to claim 12,
wherein the first communications network comprises:
an authentication, authorisation and accounting (AAA) server as the element configured to authenticate the user equipment in the first communications network and as the server element,
a home subscriber server database comprising information associated with the user of the user equipment as the database, and
a home authentication, authorisation and accounting (AAA) roaming proxy as the proxy element,
wherein the authentication, authorisation and accounting server is configured to be in communication with the home subscriber server database and the home authentication, authorisation and accounting roaming proxy,
wherein the second communications network comprises at least an access control element and a visited authentication, authorisation and accounting (AAA) roaming proxy, wherein the visited authentication, authorisation and accounting roaming proxy is configured to be in communication with the access control element and the home authentication, authorisation and accounting (AAA) roaming proxy in the first communications network,
wherein the user equipment is configured to receive the generated second network access user identifier from the first communications network and to send the generated second network access user identifier to the access control element in the second communications network, wherein the access control element is configured to forward the received second network access user identifier to the visited roaming authentication, authorisation and accounting proxy, wherein the visited roaming authentication, authorisation and accounting proxy is configured to forward the received second network access user identifier to the home authentication, authorisation and accounting roaming proxy, and wherein the home authentication, authorisation and accounting roaming proxy is configured to receive the second network access user identifier, to inquire a corresponding second part by sending the first part in an inquiry to the authentication, authorisation and accounting server, to receive the corresponding second part from the authentication, authorisation and accounting server, and to compare the second part received from the visited roaming authentication, authorisation and accounting proxy with the corresponding second part received from the authentication, authorisation and accounting server, and, if they are the same, to provide the user equipment with network access authentication to the second communications network via the visited roaming authentication, authorisation and accounting proxy and the access control element.

14. The system according to claim 13, wherein the authentication, authorisation and accounting server comprises a bootstrapping server function configured to generate the second network access user identifier of the second network domain type, to inquire the corresponding second part and to compare the received second part with the retrieved second part.

15. A proxy comprising
at least one processor; and
memory including at least one software routine;
wherein the memory and the at least one software routine are configured to, with the at least one processor, cause the proxy to:
control network access authentication for a user using a user equipment communicating in a first communications network, which first communications network uses a first network domain type of identifications and a first network access authentication mechanism to control network access to the first communications network, to a second communications network, which is different from the first communications network and uses a second network domain type of identifications and a second network access authentication mechanism to control network access to the second communications network, wherein the second network access authentication mechanism is different from the first network access authentication mechanism, the second network domain type of identifiers are different from the first network domain type of identifiers and cannot be used in authentication to the first communications network, and the first network domain type of identifiers cannot be used in authentication to the second communications network, and the second communications network is different from the first communications network;
receive a network access user identifier of the second network domain type of identifications used in network access authentication in the second communications network, the network access user identifier comprising a first part and a second part;
retrieve, using only the first part of the received network access user identifier of the second network domain type, a corresponding second part from a database;
compare the received second part with the retrieved corresponding second part; and
provide, in response to the received second part being the same as the retrieved corresponding second part, the user of the user equipment with network access authentication to the second communications network.

16. The proxy according to claim 15, wherein the memory and the at least one software routine are further configured to, with the at least one processor, cause the proxy to retrieve the corresponding second part by sending an inquiry comprising the first part to an authentication, authorization and accounting server that comprises a bootstrapping server function and is used in network access authentication of the user equipment in the first communications network, and by receiving as an inquiry response the corresponding second part from the authentication, authorization and accounting server.

17. The proxy according to claim 15, wherein the proxy is further configured to receive the network access user identifier of the second network domain type, sent by the user equipment via an access control element, from another proxy, and to provide the network access authentication to the second communications network via the other proxy and the access control element.

18. A server element comprising:
at least one processor; and
memory including at least one software routine;
wherein the memory and the at least one software routine are configured to, with the at least one processor, cause the server element to:
authenticate a user of a user equipment to a first communications network by a first network access user identifier of a first network domain type of identifications and a first network access authentication mechanism;
generate, after a successful network access authentication of the user of the user equipment to the first communications network, a second network access user identifier of a second network domain type of identifications used in a second network access authentication mechanism to control network access to a second communications network, the second network access user identifier comprising a first part and a second part and being different from the first network access user identifier and cannot be used in authentication to the first communications network, and the first network access user identifier cannot be used in authentication to the second communications network, wherein the second network access authentication mechanism is different from the first network access authentication mechanism and the second communications network is different from the first communications network;
transmit the generated second network access user identifier of the second network domain type of identifications;
receive an inquiry comprising the first part;
retrieve, using only the first part, a corresponding second part from a database; and
send, as a response to the received inquiry, the retrieved corresponding second part.

19. The server element according to claim 18, wherein the memory and the at least one software routine are further configured to, with the at least one processor, cause the server element to use a bootstrapping server function to generate the second network access user identifier.

20. The server element according to claim 18, wherein the server element is further configured to transmit the generated second network access user identifier to the user equipment, and to receive the inquiry from, and send the response to the inquiry to, an authentication, authorization and accounting server in the first communications network.

21. A computer program product stored in a device-readable non-transitory medium and comprising program instructions, wherein execution of said program instructions causes an apparatus containing the computer program product to perform a process, the process comprising:

authenticating a user of a user equipment to a first communications network by a first network access identifier of a first network domain type of identifications and a first network access authentication mechanism;

generating, after the authenticating and in response to success in the network access authentication of the user of the user equipment to the first communications network, a second network access identifier of a second network domain type of identifications for use in network access authentication to a second communications network in accordance with a second network access authentication mechanism that is different from the first network access authentication mechanism and controls network access to the second communications network, wherein the second network access user identifier is different from the first network access user identifier and cannot be used in authentication to the first communications network, and the first network access user identifier cannot be used in authentication to the second communications network, and the second communications network is different from the first communications network;

receiving the second network access identifier of the second network domain type of the identifications used in the second communications network for network access authentication, the second network access identifier comprising a first part and a second part;

retrieving, using only the first part of the second network access identifier, a corresponding second part from a database; and comparing the received second part with the retrieved corresponding second part and, if they are the same, providing the user of the user equipment with network access authentication to the second communications network.

* * * * *